(12) United States Patent
Deshpande et al.

(10) Patent No.: US 7,707,346 B2
(45) Date of Patent: Apr. 27, 2010

(54) PCI EXPRESS MULTI-ROOT IOV ENDPOINT RETRY BUFFER CONTROLLER

(75) Inventors: Venkatesh Deshpande, Karnataka (IN); Aniruddha Haldar, Kolkata (IN); Sujil Kottekkat, Kerala (IN)

(73) Assignee: LSI Corporation, Milpitas, CA (US)

( * ) Notice: Subject to any disclaimer, the term of this patent is extended or adjusted under 35 U.S.C. 154(b) by 99 days.

(21) Appl. No.: 12/075,486

(22) Filed: Mar. 12, 2008

(65) Prior Publication Data
US 2009/0235008 A1 Sep. 17, 2009

(51) Int. Cl.
*G06F 13/36* (2006.01)
(52) U.S. Cl. ..................................... 710/310
(58) Field of Classification Search ................ 709/237; 710/52, 310
See application file for complete search history.

(56) References Cited

U.S. PATENT DOCUMENTS

| 7,424,565 B2* | 9/2008 | Sandven et al. ........... 710/310 |
| 7,509,531 B2* | 3/2009 | Hsu ......................... 714/17 |
| 7,536,473 B2* | 5/2009 | Ajanovic et al. ........... 709/234 |
| 2007/0112996 A1* | 5/2007 | Manula et al. ............. 710/310 |
| 2007/0268931 A1* | 11/2007 | Shaikli ..................... 370/468 |
| 2008/0151753 A1* | 6/2008 | Wynne ...................... 370/235 |
| 2009/0006710 A1* | 1/2009 | Daniel et al. ............... 710/315 |

OTHER PUBLICATIONS

Multi-Root I/O Virtualization and Sharing Revision 0.7, Jun. 8, 2007, pp. 1-231, Publisher: PCI-SIG, Published in: US.
PCI Express Base Specification Revision 1.1, Mar. 28, 2005, pp. 1-508, Publisher: PCI-SIG, Published in: US.

* cited by examiner

*Primary Examiner*—Paul R Myers
(74) *Attorney, Agent, or Firm*—Suiter Swantz pc llo

(57) ABSTRACT

The link layer of the multi-root PCI (peripheral component interconnect) express device stores transaction layer packets (TLPs) sent from a transaction layer in a dedicated retry buffer dedicated to the virtual hierarchy (VH) associated with the TLP. The link layer of the multi-root device also stores information related to the TLP about the VH and an address of the TLP stored in the dedicated retry buffer in a sequence buffer. Upon receipt of a reset request for a VH, the link layer may purge the dedicated retry buffer associated with the VH. After purging, the multi-root device may send an ACK (acknowledge code) DLLP (data link layer packet), indicating that the VH has been successfully reset. By utilizing multiple retry buffers, the ACK DLLP response for a VH reset is sent as soon as the retry buffer pointers are reset to initial values.

13 Claims, 8 Drawing Sheets

PCI EXPRESS MULTI-ROOT IOV ENDPOINT RETRY BUFFER CONTROLLER

TECHNICAL FIELD

The present disclosure generally relates to the field of computer system interconnection, and more particularly to PCI (peripheral component interconnect) Express.

BACKGROUND

PCI (peripheral component interconnect) express (PCIe) is a computer expansion card interface format. PCIe is structured around point-to-point full duplex serial links called lanes. PCIe enables PCIe components to be interconnected to a computing device. PCIe IOV (input/output virtualization) allows PCIe components to be utilized by more than one system image (a software component running on a virtual system to which specific virtual and physical devices may be assigned). In a PCIe single-root IOV topology, PCIe components may be utilized by multiple system images running on a single computing device under a single root complex. In a PCIe multiple-root IOV topology, PCIe components may be utilized by multiple system images running on multiple computer devices under multiple root complexes. A virtual hierarchy is the portion of a PCIe IOV topology assigned to a single PCIe domain hierarchy.

SUMMARY

The present disclosure provides a retry buffer architecture utilized in the link layer of a multi-root device. TLPs (transaction layer packets) may be sent from a transaction layer of the multi-root device to a link layer of the multi-root device. The link layer of the multi-root device may store the TLP in a dedicated retry buffer dedicated to the virtual hierarchy associated with the TLP. The multi-root device may include a dedicated retry buffer for each virtual hierarchy supported. The link layer of the multi-root device may also store information related to the TLP about the virtual hierarchy and byte address of the end and/or the start of the TLP stored in the dedicated retry buffer in a sequence buffer. The link layer may send the TLP to a physical layer of the multi-root device. The link layer may start a replay timer when sending the TLP to the physical layer of the multi-root device. If the multi-root device receives an ACK (acknowledge code) DLLP (data link layer packet) related to the TLP, the link layer may purge the TLP from the dedicated retry buffer and may purge the information related to the TLP from the sequence buffer. If the multi-root device receives a NAK (negative acknowledge code) DLLP related to the TLP, the link layer may resend the TLP from the dedicated retry buffer to the physical layer utilizing the information related to the TLP from the sequence buffer. If the multi-root device does not receive an ACK DLLP or a NAK DLLP related to the TLP within an expiration of a period of time measured from the replay timer, the link layer may resend the TLP from the dedicated retry buffer to the physical layer utilizing the information related to the TLP from the sequence buffer.

If the multi-root device receives a reset request for a virtual hierarchy, the link layer may purge the dedicated retry buffer associated with the virtual hierarchy. The link layer may purge the dedicated retry buffer associated with the virtual hierarchy by setting the read pointer of the dedicated retry buffer equal to the write pointer of the dedicated retry buffer. After the dedicated retry buffer associated with the virtual hierarchy has been purged, the multi-root device may send an ACK DLLP, indicating that the virtual hierarchy has been successfully reset. The link layer may also purge information relating to TLPs associated with the virtual hierarchy from the sequence buffer. The multi-root device may send an ACK DLLP, indicating that the virtual hierarchy has been successfully reset after the dedicated retry buffer associated with the virtual hierarchy has been purged but prior to information relating to TLPs associated with the virtual hierarchy from the sequence buffer has been purged. The link layer may allocate the dedicated retry buffer associated with the virtual hierarchy, after the dedicated retry buffer associated with the virtual hierarchy has been purged, to one or more of the other virtual hierarchies. The link layer may allocate the dedicated retry buffer associated with the virtual hierarchy to one or more of the other dedicated retry buffers associated with one or more of the other virtual hierarchies after the dedicated retry buffer associated with the virtual hierarchy has been purged.

By utilizing multiple retry buffers (one for each virtual hierarchy supported) to implement the retry buffer in the link layer of the multi-root device, the present disclosure provides improved control over TLPs in the link layer in the event of a reset request from the root of the virtual hierarchy. The present disclosure improves the response time for an ACK DLLP response for a virtual hierarchy reset. The ACK DLLP response for the virtual hierarchy reset is sent as soon as the retry buffer pointers are reset to initial values. In an implementation where only a single retry buffer was utilized for all supported virtual hierarchies, the ACK DLLP response for a virtual hierarchy reset would require a number of cycles approximately equal to the difference between the read and the write pointers of the retry buffer (for example—approximately 20 milliseconds if the retry buffer size is 16 kilobytes, or 4 kilobytes by 4 kilobytes, running at 200 megahertz).

It is to be understood that both the foregoing general description and the following detailed description are exemplary and explanatory only and are not necessarily restrictive of the present disclosure. The accompanying drawings, which are incorporated in and constitute a part of the specification, illustrate subject matter of the disclosure. Together, the descriptions and the drawings serve to explain the principles of the disclosure.

BRIEF DESCRIPTION OF THE DRAWINGS

The numerous advantages of the disclosure may be better understood by those skilled in the art by reference to the accompanying figures in which.

DETAILED DESCRIPTION

Reference will now be made in detail to the subject matter disclosed, which is illustrated in the accompanying drawings.

Figure 1:
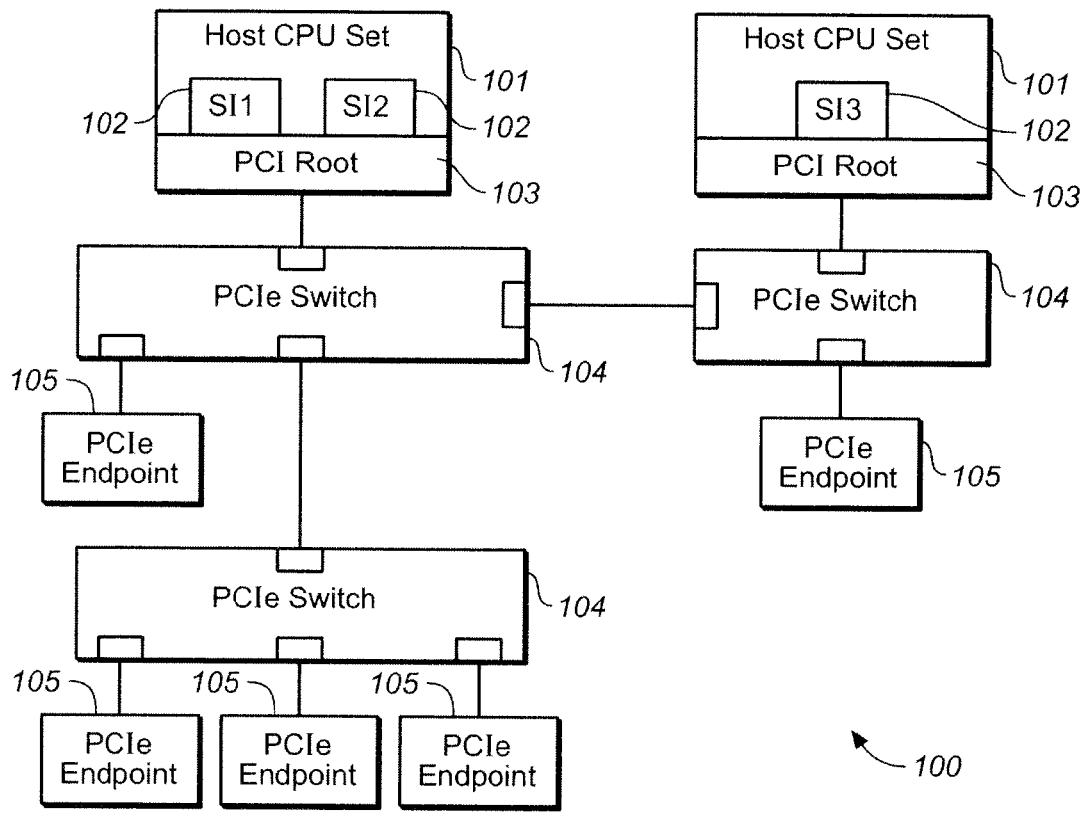
FIG. 1 is a block diagram illustrating a PCI express multi-root IOV topology, in accordance with an exemplary embodiment of the present disclosure.

FIG. 1 illustrates a PCI (peripheral component interconnect) express (PCIe) multi-root IOV (input/output virtualization) topology 100, in accordance with an exemplary embodiment of the present disclosure. The topology 100 comprises a plurality of computing devices 101, each including one or more system images 102, coupled to a multi-root fabric (the subset of a PCIe fabric containing multi-root enabled links and connected multi-root aware components), including one or more PCIe switches 104 and one or more PCIe endpoints 105, via PCI roots 103. The topology 100 is configured to construct a unique virtual hierarchy for each system image 102. Thus, each system image 102 is able to be configured to utilize any of PCIe endpoints 105 through a virtual hierarchy without any interaction with or awareness of the virtual hierarchies associated with the other system images.

As discussed in "Multi-Root I/O Virtualization and Sharing" revision 0.7 (PCISIG, Jun. 8, 2007) and "PCI Express Base Specification" revision 2.0 (PCISIG, Dec. 20, 2006), which are herein incorporated by reference, PCIe devices may communicate via transaction layer packets (TLPs). An originating PCIe device may generate TLPs in its transaction layer. The transaction layer may deliver the TLPs to a link layer of the originating PCIe device. The link layer may store the TLPs in a retry buffer and send the TLPs to a physical layer of the originating PCIe device for transmittal to a target PCIe device. If the target PCIe device receives a TLP correctly, the target PCIe device may send an ACK (acknowledge code) DLLP (data link layer packet). Upon receipt of the ACK DLLP, the link layer of the originating PCIe device may remove the TLP from the retry buffer. If the target PCIe device receives a TLP incorrectly, the target PCIe device may send an NAK (negative acknowledge code) DLLP (data link layer packet). Upon receipt of the NAK DLLP, the link layer of the originating PCIe device may resend the TLP from the retry buffer. The link layer of the originating PCIe device may set a replay timer when a TLP is sent to the physical layer to the physical layer of the originating PCIe device for transmittal to a target PCIe device. If an ACK DLLP or a NAK DLLP is not received within a period of time, the link layer the link layer of the originating PCIe device may resend the TLP from the retry buffer.

Resetting individual virtual hierarchies in a multi-root fabric may be performed utilizing DLLPs rather than TLPs in order to avoid the delays associated with TLP processing in a fabric. A virtual hierarchy reset may be intended to reset only the targeted virtual hierarchy, leaving other virtual hierarchies unaffected. When a request to reset a virtual hierarchy is received, all outstanding TLPs for the virtual hierarchy may be discarded from both the transaction and link layer. The TLPs in the retry buffer may be purged selectively, without affecting the TLPs of other virtual hierarchies. Once the retry buffer has been selectively purged of TLPs of the virtual hierarchy without affecting TLPs of other virtual hierarchies, an ACK DLLP may be sent in response to the request to reset the virtual hierarchy, indicating that the virtual hierarchy has been successfully reset. Thus, delay between receipt of a request to reset the virtual hierarchy and the ACK DLLP sent in response to the request to reset the virtual hierarchy may depend on the time period required for purging of the retry buffer.

Figure 2:
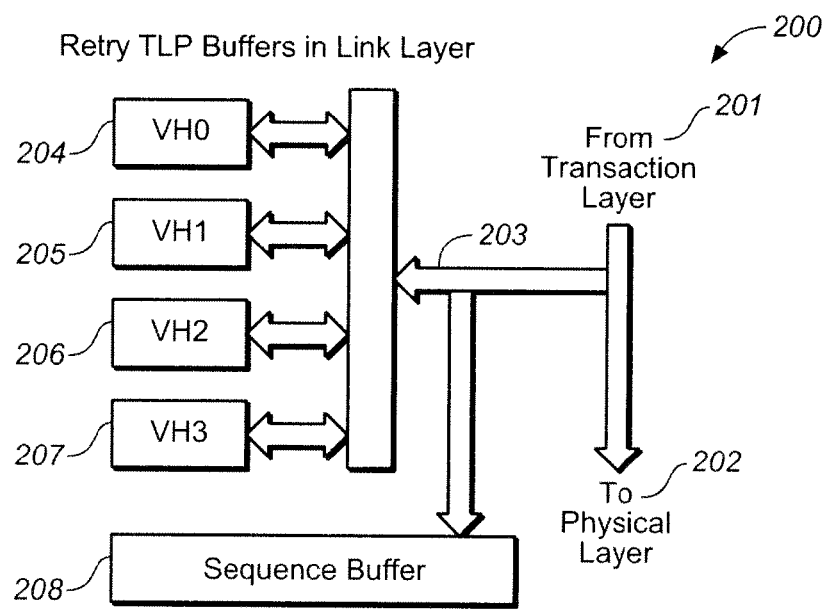
FIG. 2 is a block diagram illustrating a retry buffer architecture utilized in the link layer of a multi-root device, in accordance with an exemplary embodiment of the present disclosure.

FIG. 2 illustrates a retry buffer architecture 200 utilized in a link layer 203 of a multi-root device, in accordance with an exemplary embodiment of the present disclosure. One or more TLPs may be sent from a transaction layer 201 of the multi-root device to a link layer 203 of the multi-root device. The link layer 203 of the multi-root device may store the TLP in a dedicated retry buffer 204-207 associated with the virtual hierarchy of the TLP. The multi-root device may include a dedicated retry buffer 204-207 for each virtual hierarchy supported. For example, if the multi-root device supports eighty virtual hierarchies, the multi-root device may include eighty dedicated retry buffers 204-207. The size of each dedicated retry buffer 204-207 may depend on a maximum payload size supported and/or the latency in ACK DLLP transmissions. The link layer 203 of the multi-root device may also store information related to the TLP about the virtual hierarchy and byte address of the end and/or the start of the TLP stored in the dedicated retry buffer 204-207 in a sequence buffer 208. The link layer 203 may send the TLP to a physical layer 202 of the multi-root device. The link layer 203 may start a replay timer when sending the TLP to the physical layer of the multi-root device. If the multi-root device receives an ACK DLLP related to the TLP, the link layer 203 may purge the TLP from the dedicated retry buffer 204-207 and may purge the information related to the TLP from the sequence buffer 208. If the multi-root device receives a NAK DLLP related to the TLP, the link layer 203 may resend the TLP from the dedicated retry buffer 204-207 to the physical layer 202 utilizing the information related to the TLP from the sequence buffer 208. If the multi-root device does not receive an ACK DLLP or a NAK DLLP related to the TLP within an expiration of a period of time measured from the replay timer, the link layer 203 may resend the TLP from the dedicated retry buffer 204-207 to the physical layer 202 utilizing the information related to the TLP from the sequence buffer 208. The multi-root device may comprise a PCIe multi-root IOV endpoint.

If the multi-root device receives a reset request for a virtual hierarchy, the link layer 203 may purge the dedicated retry buffer 204-207 associated with the virtual hierarchy. The link layer 203 may purge the dedicated retry buffer 204-207 associated with the virtual hierarchy by setting the read pointer of the dedicated retry buffer 204-207 equal to the write pointer of the dedicated retry buffer 204-207. After the dedicated retry buffer 204-207 associated with the virtual hierarchy has been purged, the multi-root device may send an ACK DLLP, indicating that the virtual hierarchy has been successfully reset. The link layer 203 may also purge information relating to TLPs associated with the virtual hierarchy from the sequence buffer 208. The multi-root device may send an ACK DLLP, indicating that the virtual hierarchy has been successfully reset after the dedicated retry buffer 204-207 associated with the virtual hierarchy has been purged but prior to information relating to TLPs associated with the virtual hierarchy from the sequence buffer 208 has been purged. The link layer 203 may allocate the dedicated retry buffer 204-207 associated with the virtual hierarchy, after the dedicated retry buffer 204-207 associated with the virtual hierarchy has been purged, to one or more of the other virtual hierarchies. The link layer 203 may allocate the dedicated retry buffer 204-207 associated with the virtual hierarchy, after the dedicated retry buffer 204-207 associated with the virtual hierarchy has been purged, to one or more of the other dedicated retry buffers 204-207 associated with one or more of the other virtual hierarchies.

Figure 3:
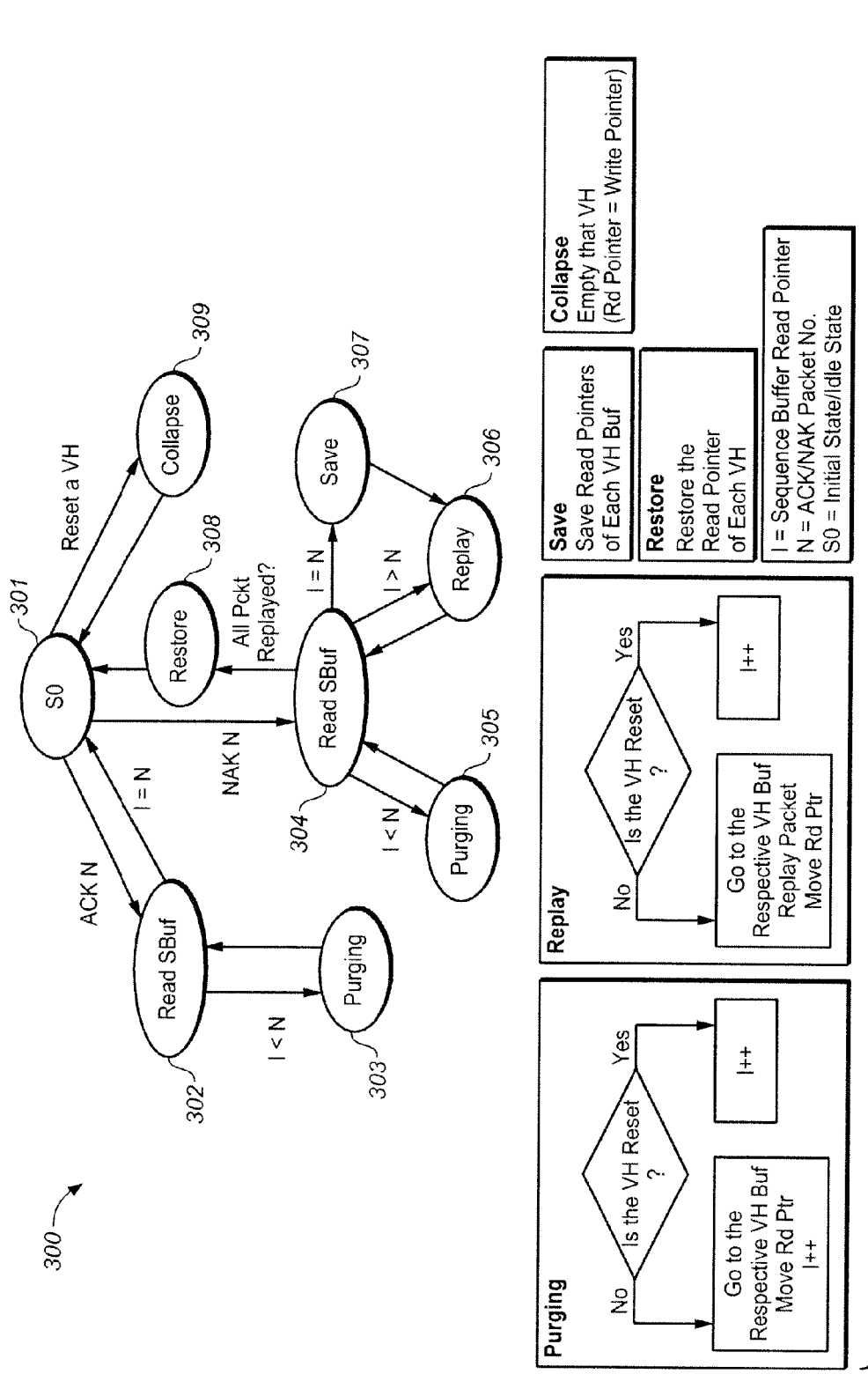
FIG. 3 is a state diagram of retry buffer control for a multi-root device, in accordance with an exemplary embodiment of the present disclosure.

FIG. 3 is a state diagram of retry buffer control 300 for a multi-root device, in accordance with an exemplary embodiment of the present disclosure. From an initial state 301, an ACK N DLLP (where N is the sequence number of the TLP that was sent out of link layer) may be received, a NAK N DLLP may be received, or a request to reset a virtual hierarchy may be received.

If an ACK N DLLP is received, the state may move to a first read sequence buffer state 302 where the sequence buffer is read to determine which virtual hierarchy retry buffer is concerned. If the read pointer of the sequence buffer is less than N, the state may move to a first purging state 303 (once purging of an acknowledged packet is done the state may move to the read sequence buffer state 302). The iterations between the states 302 and 303 continue until all the acked packets are purged from respective dedicated VH retry buffers. Alternatively, the state may move to the initial state 301.

If a NAK N DLLP is received, the state may move to the second read sequence buffer state 304 where the sequence buffer is read to determine which virtual hierarchy retry buffer is concerned. It may be determined whether the sequence read pointer is greater less than N, equal to N, or greater than N. If the sequence read pointer is less than N, the state may move to a second purging state 305 (once purging of an acknowledged packet is done the state may move to the second read sequence buffer state 304).The iterations between the states 304 and 305 continue till all the acknolwedged packets are purged from respective dedicated VH retry buffers. If the sequence read pointer is equal to N, the state may move to a save state 307 where the read pointers of each virtual hierarchy buffer may be saved. The state may then move to a replay state 306 where a packet is replayed (after the packet is replayed it may again be determined whether the sequence read pointer is greater less than N, equal to N, or greater than N). If the sequence read pointer is greater than N, the state may move to the replay state 306 where a packet is replayed. After all packets have been replayed, the state may move to the restore state 308 where the read pointers for each virtual hierarchy are restored. The state may then move back to the initial state 301.

If a request to reset a virtual hierarchy is received, the state may move to a collapse state 309 where the virtual hierarchy retry buffer associated with the virtual hierarchy requested to be reset may be purged. The state may then move back to the initial state 301.

At the first and/or second purge state(s) 303 and/or 305, if a virtual hierarchy has been reset, a sequence buffer read pointer may be incremented. Alternatively, the read pointer of a virtual hierarchy retry buffer is incremented and the sequence buffer read pointer is incremented. At the replay state 306, if a virtual hierarchy has been reset, the sequence buffer read pointer may be incremented. Alternatively, a packet may be replayed from a virtual hierarchy retry buffer and the read pointer of the virtual hierarchy retry buffer may be incremented. At the save state 307, the current read pointer values of the respective virtual hierarchy retry buffers may be saved into respective save registers. At a restore state 308, the read pointers of the respective virtual hierarchy retry buffers may be restored to the original values saved in the respective save registers. At a collapse state 309, the particular virtual hierarchy retry buffer may be purged by setting the virtual hierarchy retry buffer read pointer equal to the virtual hierarchy retry buffer write pointer.

Figure 4:
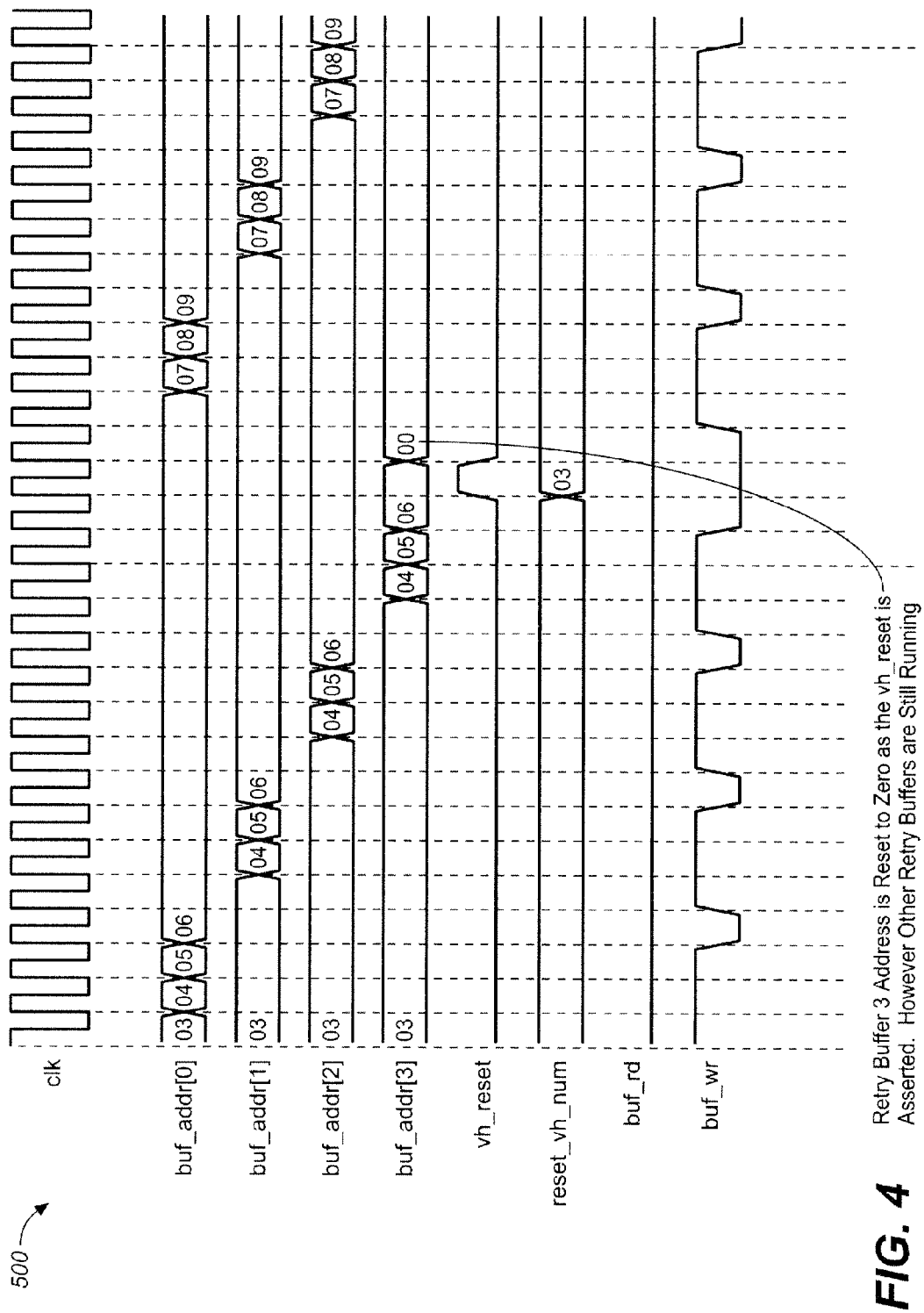
FIG. 4 is a diagram illustrating the waveforms of a virtual hierarchy reset applied to a virtual hierarchy associated with a dedicated retry buffer, in accordance with an exemplary embodiment of the present disclosure.

FIG. 4 illustrates the waveforms of a virtual hierarchy reset applied to a virtual hierarchy associated with dedicated retry buffer 207 of FIG. 2 (indicated as buf_addr[3] in FIG. 4), in accordance with an exemplary embodiment of the present disclosure. As illustrated, buf addr[3] is purged immediately and an ACK DLLP may be sent out for the reset request. The remaining dedicated retry buffers 204-206 (indicated as buf_addr[0], buf_addr[1], and buf_addr[2] respectively in FIG. 4) are unaffected. The information stored in sequence buffer 208 associated with dedicated retry buffer 207 will be purged as there is forward progress on TLPs associated with other virtual hierarchies.

Figure 5:
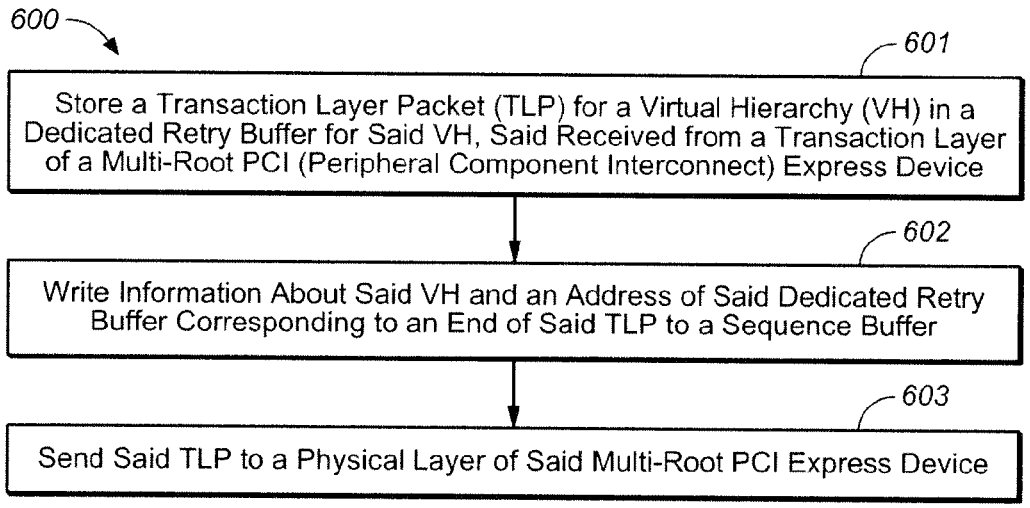
FIG. 5 is a flow chart illustrating a method of retry buffer control for a multi-root device, in accordance with an exemplary embodiment of the present disclosure.

FIG. 5 illustrates a method 600 of retry buffer control for a multi-root device, in accordance with an exemplary embodiment of the present disclosure. In step 601, store a TLP for a virtual hierarchy (VH) in a dedicated retry buffer for said VH, said TLP received from a transaction layer of a multi-root PCI express device. The multi-root PCI express device may comprise a multi-root PCI express endpoint. In step 602, write information about said VH and an address of said dedicated retry buffer corresponding to an end of said TLP to a sequence buffer. In step 603, send said TLP to a physical layer of said multi-root PCI express device.

Figure 6:
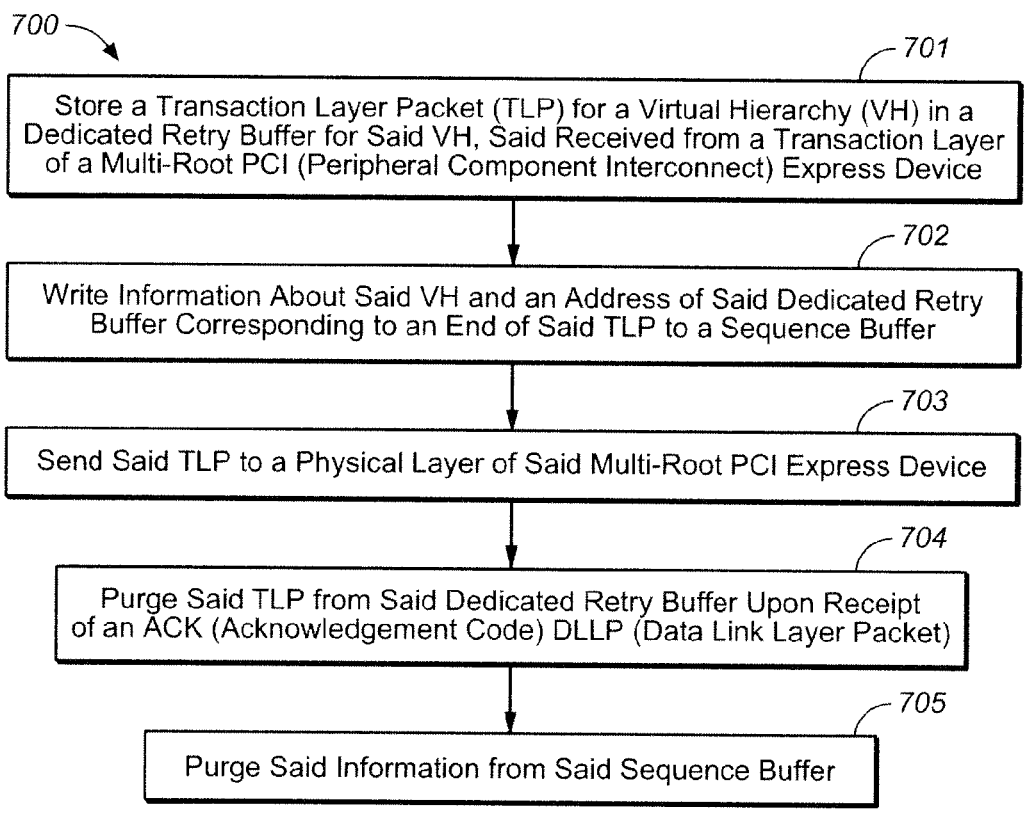
FIG. 6 is a flow chart illustrating a method of retry buffer control for a multi-root device, in accordance with an alternative embodiment of the present disclosure.

FIG. 6 illustrates a method 700 of retry buffer control for a multi-root device, in accordance with an alternative embodiment of the present disclosure. In step 701, store a TLP for a virtual hierarchy (VH) in a dedicated retry buffer for said VH, said TLP received from a transaction layer of a multi-root PCI express device. The multi-root PCI express device may comprise a multi-root PCI express endpoint. In step 702, write information about said VH and an address of said dedicated retry buffer corresponding to an end of said TLP to a sequence buffer. In step 703, send said TLP to a physical layer of said multi-root PCI express device. In step 704, purge said TLP from said dedicated retry buffer upon receipt of an ACK DLLP. In step 705, purge said information from said sequence buffer.

Figure 7:
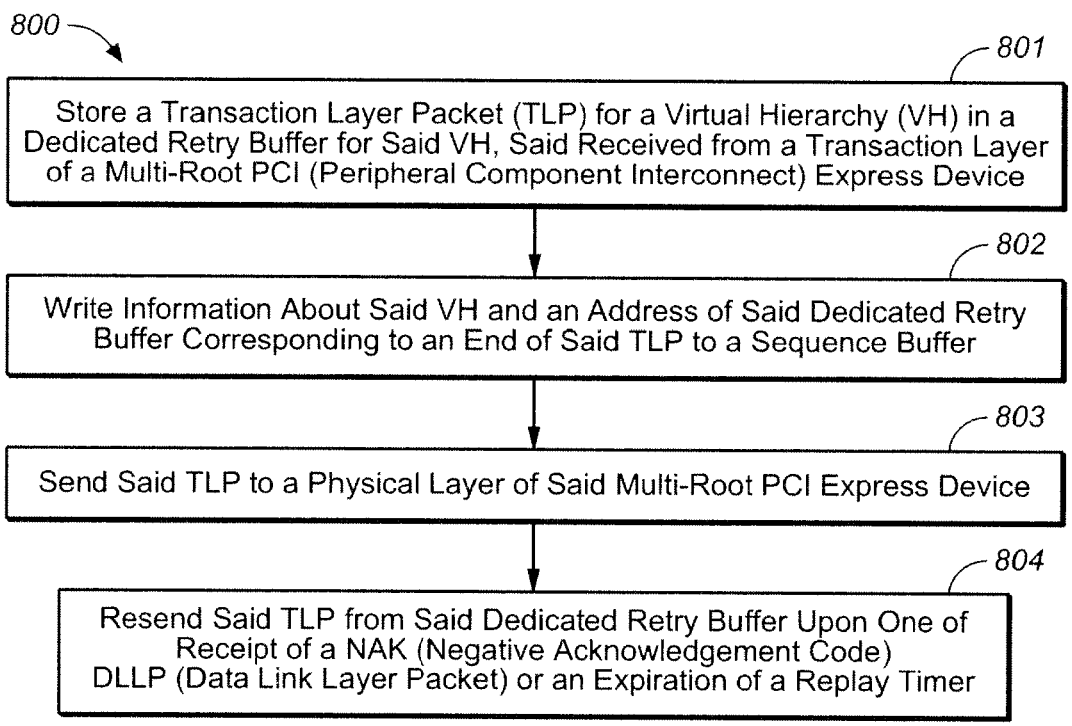
FIG. 7 is a flow chart illustrating a method of retry buffer control for a multi-root device, in accordance with an alternative embodiment of the present disclosure.

FIG. 7 illustrates a method 800 of retry buffer control for a multi-root device, in accordance with an exemplary embodiment of the present disclosure. In step 801, store a TLP for a virtual hierarchy (VH) in a dedicated retry buffer for said VH, said TLP received from a transaction layer of a multi-root PCI express device. The multi-root PCI express device may comprise a multi-root PCI express endpoint. In step 802, write information about said VH and an address of said dedicated retry buffer corresponding to an end of said TLP to a sequence buffer. In step 803, send said TLP to a physical layer of said multi-root PCI express device. In step 804, resend said TLP from said dedicated retry buffer upon one of receipt of a NAK DLLP or an expiration of a replay timer.

Figure 8:
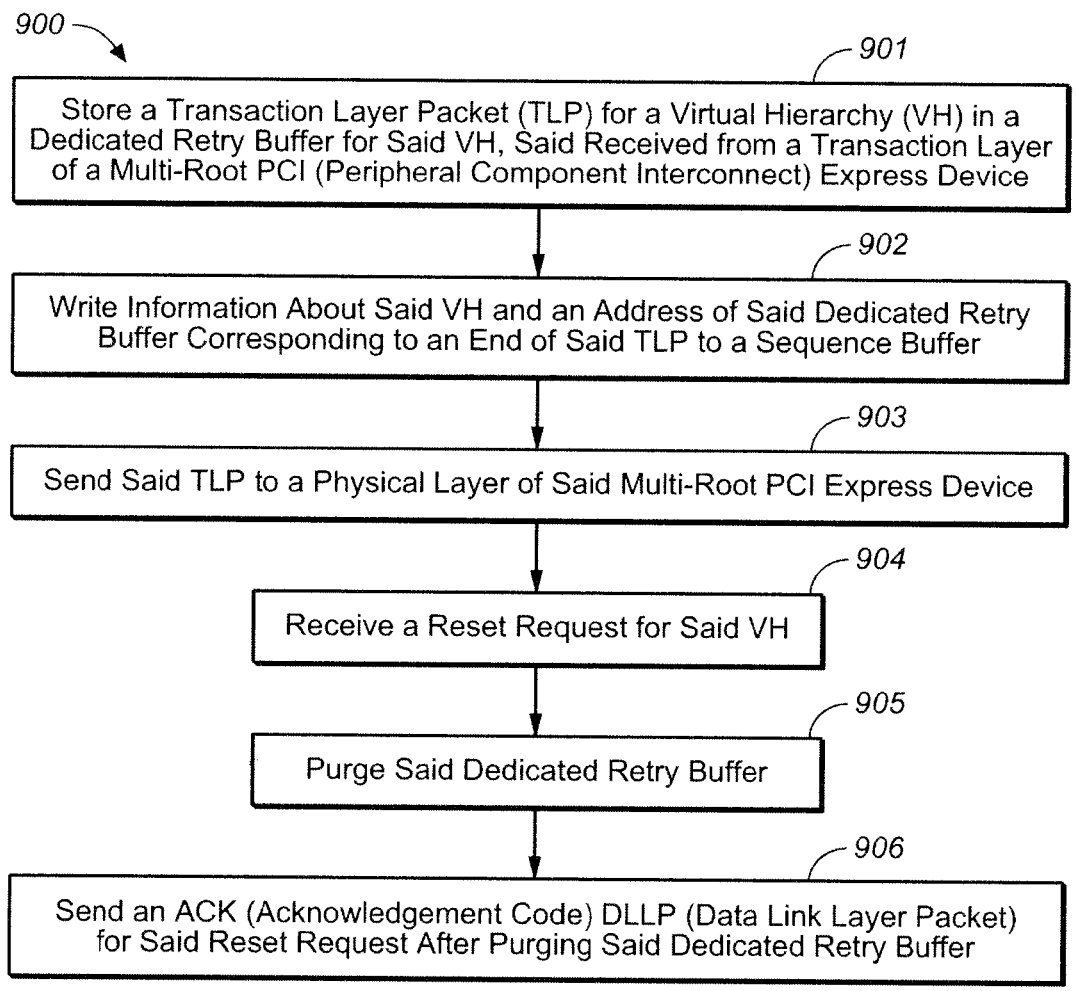
FIG. 8 is a flow chart illustrating a method of retry buffer control for a multi-root device, in accordance with an alternative embodiment of the present disclosure.

FIG. 8 illustrates a method 900 of retry buffer control for a multi-root device, in accordance with an exemplary embodiment of the present disclosure. In step 901, store a TLP for a virtual hierarchy (VH) in a dedicated retry buffer for said VH, said TLP received from a transaction layer of a multi-root PCI express device. The multi-root PCI express device may comprise a multi-root PCI express endpoint. In step 902, write information about said VH and an address of said dedicated retry buffer corresponding to an end of said TLP to a sequence buffer. In step 903, send said TLP to a physical layer of said multi-root PCI express device. In step 904, receive a reset request for said VH. In step 905, purge said dedicated retry buffer. In step 906, send an ACK DLLP for said reset request after purging said dedicated retry buffer.

Figure 9:
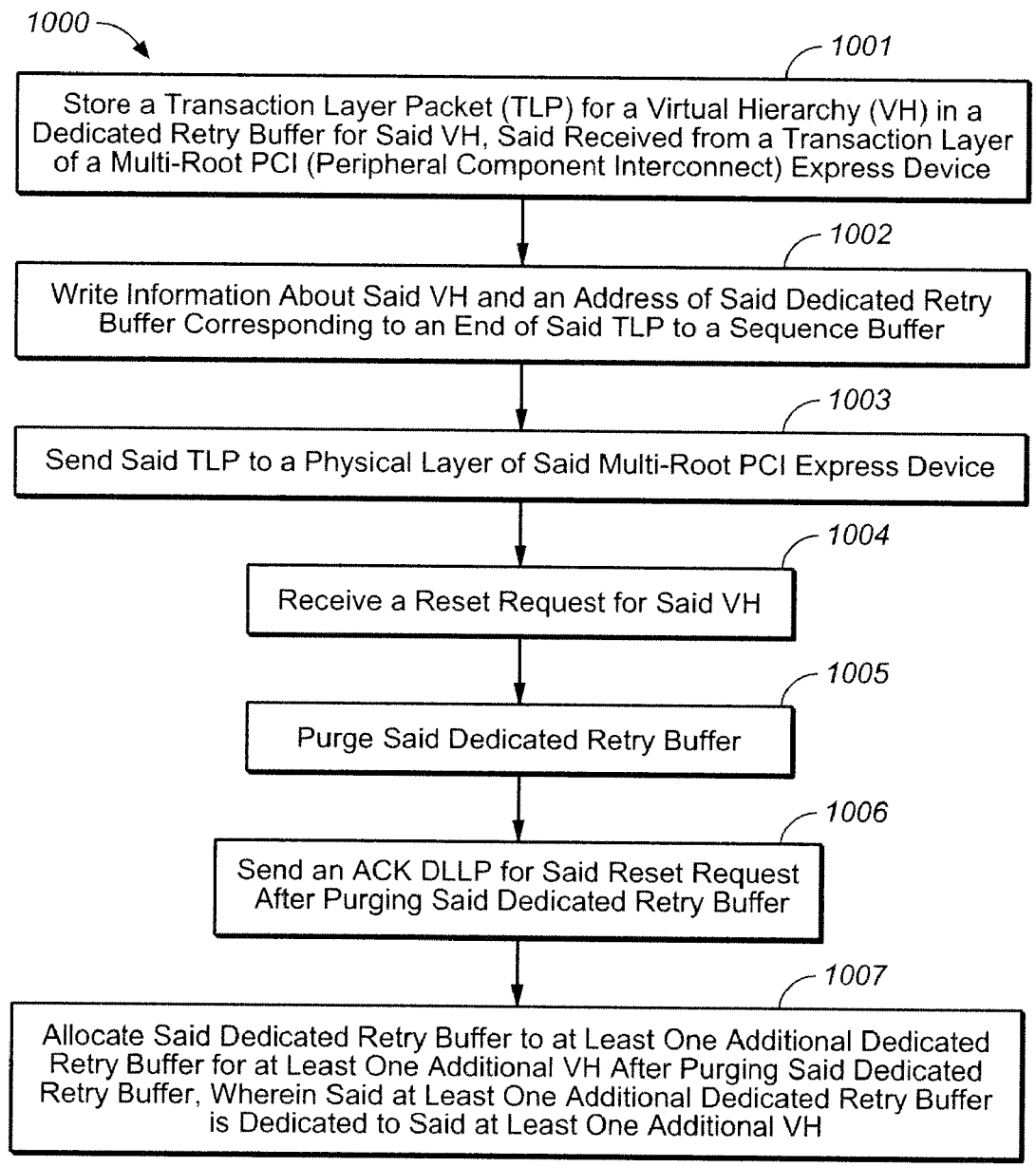
FIG. 9 is a flow chart illustrating a method of retry buffer control for a multi-root device, in accordance with an alternative embodiment of the present disclosure.

FIG. 9 illustrates a method 1000 of retry buffer control for a multi-root device, in accordance with an exemplary embodiment of the present disclosure. In step 1001, store a TLP for a virtual hierarchy (VH) in a dedicated retry buffer for said VH, said TLP received from a transaction layer of a multi-root PCI express device. The multi-root PCI express device may comprise a multi-root PCI express endpoint. In step 1002, write information about said VH and an address of said dedicated retry buffer corresponding to an end of said TLP to a sequence buffer. In step 1003, send said TLP to a physical layer of said multi-root PCI express device. In step 1004, receive a reset request for said VH. In step 1005, purge said dedicated retry buffer. In step 1006, send an ACK DLLP for said reset request after purging said dedicated retry buffer. In step 1007, allocate said dedicated retry buffer to at least one additional dedicated retry buffer for at least one additional VH after purging said dedicated retry buffer, wherein said at least one additional dedicated retry buffer is dedicated to said at least one additional VH.

Figure 10:
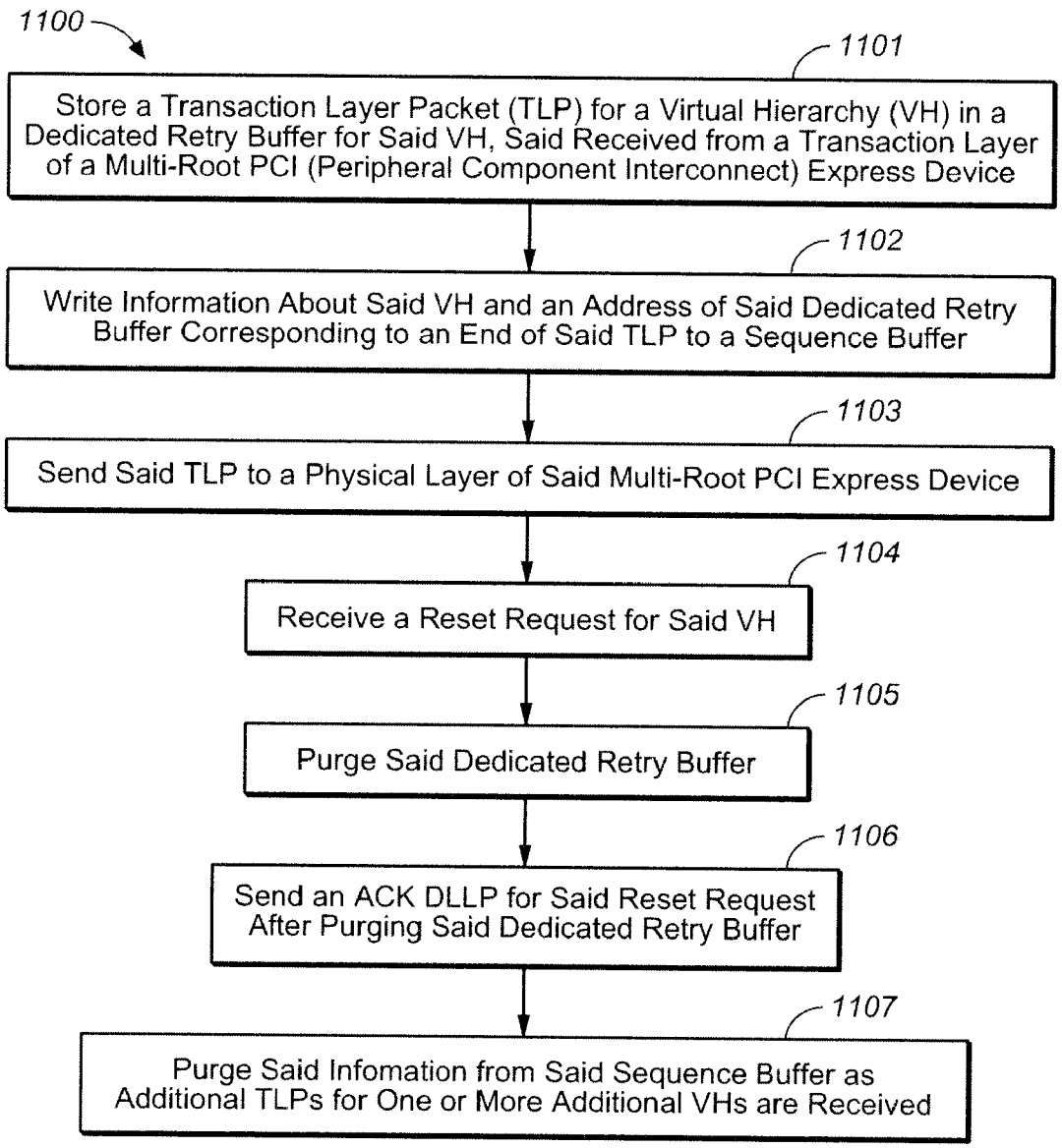
FIG. 10 is a flow chart illustrating a method of retry buffer control for a multi-root device, in accordance with an alternative embodiment of the present disclosure.

FIG. 10 illustrates a method 1100 of retry buffer control for a multi-root device, in accordance with an exemplary embodiment of the present disclosure. In step 1101, store a TLP for a virtual hierarchy (VH) in a dedicated retry buffer for said VH, said TLP received from a transaction layer of a multi-root PCI express device. The multi-root PCI express device may comprise a multi-root PCI express endpoint. In step 1102, write information about said VH and an address of said dedicated retry buffer corresponding to an end of said TLP to a sequence buffer. In step 1103, send said TLP to a physical layer of said multi-root PCI express device. In step 1104, receive a reset request for said VH. In step 1105, purge said dedicated retry buffer. In step 1106, send an ACK DLLP for said reset request after purging said dedicated retry buffer. In step 1107, purge said information from said sequence buffer as additional TLPs for one or more additional VHs are received. Said sending an ACK DLLP for said reset request after purging said dedicated retry buffer may comprise sending said send ACK DLLP for said reset request after purging said dedicated retry buffer and prior to said said information from said sequence buffer.

By utilizing multiple retry buffers (one for each virtual hierarchy supported) to implement the retry buffer in the link layer of the multi-root device, the present disclosure provides improved control over TLPs in the link layer in the event of a reset request from the root of the virtual hierarchy. The present disclosure improves the response time for an ACK DLLP response for a virtual hierarchy reset. The ACK DLLP response for the virtual hierarchy reset is sent as soon as the retry buffer pointers are reset to initial values. In an implementation where only a single retry buffer was utilized for all supported virtual hierarchies, the ACK DLLP response for a virtual hierarchy reset would require a number of cycles approximately equal to the difference between the read and the write pointers of the retry buffer (for example—approximately 20 milliseconds if the retry buffer size is 16 kilobytes, or 4 kilobytes by 4 kilobytes, running at 200 megahertz).

It is believed that the present disclosure and many of its attendant advantages will be understood by the foregoing description, and it will be apparent that various changes may be made in the form, construction and arrangement of the components without departing from the disclosed subject matter or without sacrificing all of its material advantages. The form described is merely explanatory, and it is the intention of the following claims to encompass and include such changes.

What is claimed is:
1. A method, comprising:
storing a transaction layer packet (TLP) for a virtual hierarchy (VH) in a dedicated retry buffer for said VH, said TLP received from a transaction layer of a multi-root PCI (peripheral component interconnect) express device;
writing information about said VH and an address of said dedicated retry butter corresponding to an end of said TLP to a sequence buffer;
sending said TLP to a physical layer of said multi-root PCI express device;
receiving a reset request for said VH;
purging said dedicated retry buffer;
sending an ACK (acknowledgment code) DLLP (data link layer packet) for said reset request after purging said dedicated retry buffer including sending said ACK DLLP for said reset request after purging said dedicated retry buffer and prior to said purging said information from said sequence buffer;
purging said information from said sequence buffer as additional TLPs for one or more additional VHs are received.
2. The method of claim 1, further comprising:
purging said TLP from said dedicated retry buffer upon receipt of an ACK (acknowledgment code) DLLP (data link layer packet); and
purging said information from said sequence buffer.
3. The method of claim 1, further comprising:
resending said TLP from said dedicated retry buffer upon one of receipt of a NAK (negative acknowledgement code) DLLP (data link layer packet) or an expiration of a replay timer.
4. The method of claim 1, further comprising:
allocating said dedicated retry buffer to at least one additional dedicated retry buffer for at least one additional VH after purging said dedicated retry buffer, wherein said at least one additional dedicated retry buffer is dedicated to said at least one additional VH.
5. The method of claim 1, wherein said storing a transaction layer packet (TLP) for a virtual hierarchy (VH) in a dedicated retry buffer for said VH, said TLP received from a transaction layer of a multi-root PCI (peripheral component interconnect) express device comprises:
storing said TLP for said VH in a dedicated retry buffer for said VH, said TLP received from a transaction layer of a multi-root PCI express endpoint.
6. An architecture for a multi-root PCI (peripheral component interconnect) express device, comprising:
a link layer configurable to receive transaction layer packets (TLPs) for a plurality of virtual hierarchies (VHs) from a transaction layer before sending said TLPs to a physical layer;
a plurality of retry buffers configurable to store said TLPs received by said link layer from said transaction layer;
a sequence buffer for storing information about one of said plurality of VHs and an end address of a TLP, which is for said one of said plurality of VHs, stored in one of said plurality of retry buffers,
wherein each of the plurality of retry buffers is dedicated to one of said plurality of VHs and only stores said TLPs which are for said one of said plurality of VHs, said link layer being configurable to receive a reset request for one of said plurality of VHs, purge one of said retry buffers dedicated to said one of said plurality of VHs in response to said reset request, and send an ACK (acknowledgment code) DLLP (data link layer packet) for said reset request after purging said one of said retry buffers, said link layer being configurable to send said ACK DLLP for said reset request after purging said dedicated retry buffer and prior to said purging said information about said one of said plurality of VHs and end addresses of TLPs stored in said one of said plurality of retry buffers which are for said one of said plurality of VHs from said sequence buffer, the architecture configured for purging said information from said sequence buffer as additional TLPs for one or more additional VHs are received.

7. The architecture of claim 6, wherein said link layer is configurable to purge said TLP stored in said one of said plurality of retry buffers from said one of said plurality of retry buffers upon receipt of an ACK (acknowledgment code) DLLP (data link layer packet) for said TLP and purge said information about said one of said plurality of VHs and said end address of said TLP, which is for said one of said plurality of VHs, from said sequence buffer upon receipt of said ACK DLLP for said TLP.

8. The architecture of claim 6, wherein said link layer is configurable to resend said TLP from said one of said plurality of retry buffers upon one of receipt of a NAK (negative acknowledgement code) DLLP (data link layer packet) for said TLP or an expiration of a replay timer.

9. The architecture of claim 6, wherein said link layer is configurable to rededicate said one of said retry buffers, dedicated to said one of said plurality of VHs, after purging to at least another one of said plurality of VHs.

10. The architecture of claim 6, wherein said link layer is configurable, in response to said reset request, to purge information about said one of said plurality of VHs and end addresses of TLPs stored in said one of said plurality of retry buffers which are for said one of said plurality of VHs from said sequence buffer as additional TLPs for said plurality of VHs are received.

11. The architecture of claim 6, wherein said multi-root PCI express device is a multi-root PCI express endpoint.

12. Computer executable instructions, embodied in a tangible media, for performing a method comprising:
    storing a transaction layer packet (TLP) for a virtual hierarchy (VH) in a dedicated retry buffer for said VH, said TLP received from a transaction layer of a multi-root PCI (peripheral component interconnect) express endpoint;
    writing information about said VH and an address of said dedicated retry buffer corresponding to an end of said TLP to a sequence buffer;
    sending said TLP to a physical layer of said multi-root PCI express endpoint;
    receiving a reset request for said VH;
    purging said dedicated retry buffer;
    sending an ACK (acknowledgment code) DLLP (data link layer packet) for said reset request after purging said dedicated retry buffer including sending said ACK DLLP for said reset request after purging said dedicated retry buffer and prior to said purging said information from said sequence buffer; and
    purging said information from said sequence buffer as additional TLPs for one or more additional VHs are received.

13. The computer executable instructions of claim 12, wherein the method further comprises:
    allocating said dedicated retry buffer to at least one additional dedicated retry buffer for at least one additional VH after purging said dedicated retry buffer, wherein said at least one additional dedicated retry buffer is dedicated to said at least one additional VH.

* * * * *